United States Patent
Bates et al.

(10) Patent No.: US 10,643,482 B2
(45) Date of Patent: *May 5, 2020

(54) FILL-IN-THE-BLANK AUDIO-STORY ENGINE

(71) Applicant: HALLMARK CARDS, INCORPORATED, Kansas City, MO (US)

(72) Inventors: Anne Catherine Bates, Prairie Village, KS (US); Jason Paul Gahr, Kansas City, MO (US); Adam Samuel Scheff, Overland Park, KS (US); Jason Blake Penrod, Shawnee, KS (US); Stephane Farris Young, Overland Park, KS (US); Timothy Jay Lien, Lenexa, KS (US); Michael Anthony Monaco, Jr., Overland Park, KS (US)

(73) Assignee: Hallmark Cards, Incorporated, Kansas City, MO (US)

( * ) Notice: Subject to any disclaimer, the term of this patent is extended or adjusted under 35 U.S.C. 154(b) by 618 days.

This patent is subject to a terminal disclaimer.

(21) Appl. No.: 14/628,086

(22) Filed: Feb. 20, 2015

(65) Prior Publication Data
US 2015/0161898 A1  Jun. 11, 2015

Related U.S. Application Data

(63) Continuation of application No. 13/488,070, filed on Jun. 4, 2012, now Pat. No. 8,961,183.

(51) Int. Cl.
*G09B 5/04* (2006.01)
*G09B 17/00* (2006.01)

(52) U.S. Cl.
CPC .............. *G09B 5/04* (2013.01); *G09B 17/003* (2013.01)

(58) Field of Classification Search
CPC ........ G09B 19/04; G09B 19/06; G09B 19/08; G09B 17/006
(Continued)

(56) References Cited

U.S. PATENT DOCUMENTS 5,249,965 A * 10/1993 Yianilos ................ A63F 3/0421
  273/153 R
5,829,985 A * 11/1998 Campanella ........... G09B 5/062
  434/162

(Continued)

OTHER PUBLICATIONS

Maher, Eliza Interactive Fiction, The Digital Antiquarian, Jun. 15, 2011 https://web-beta.archive.org/web/20110626190250/http://www.filfre.net/2011/06/eliza-part-1.*
(Continued)

*Primary Examiner* — Eddy Saint-Vil
*Assistant Examiner* — William D Ermlick
(74) *Attorney, Agent, or Firm* — Shook, Hardy & Bacon L.L.P.

(57) ABSTRACT

Embodiments of the present invention are generally directed to an Audio-Story Engine that includes a repository of prerecorded audio files that, when played in a certain sequence, with user provided recordings placed throughout, tell a story. To obtain the user provided recordings, the Audio-Story Engine asks the user to make audio recordings of various words or phrases. For example, the Audio-Story Engine may ask the user a series of questions in order to record and store the user's audible responses. Upon completion, the Audio-Story Engine plays back a completed story that incorporates the user's audio recordings by playing an appropriate user recording after playing a prerecorded audio file. This is repeated several times in sequence to form a seamless, customized, audio story. In addition, the Audio-Story Engine may alter the pitch or sound of the user's recorded words to match the pitch of the prerecorded story.

20 Claims, 4 Drawing Sheets

(58) Field of Classification Search
USPC .................................. 434/157, 167, 178, 185
See application file for complete search history.

(56) References Cited

U.S. PATENT DOCUMENTS

| | | | | |
|---|---|---|---|---|
| 5,915,256 | A * | 6/1999 | Rogers | G06F 17/30017 707/E17.009 |
| 6,160,986 | A * | 12/2000 | Gabai | G09B 5/04 434/307 R |
| 6,199,042 | B1 * | 3/2001 | Kurzweil | G09B 5/065 434/309 |
| 6,351,265 | B1 * | 2/2002 | Bulman | G06T 11/60 345/660 |
| 6,393,399 | B1 * | 5/2002 | Even | G10L 15/193 704/235 |
| 6,544,040 | B1 * | 4/2003 | Brelis | G09B 5/14 434/236 |
| 7,261,612 | B1 * | 8/2007 | Hannigan | G09B 5/06 382/100 |
| 7,286,649 | B1 * | 10/2007 | Nelson | H04M 3/42391 379/52 |
| 7,422,434 | B1 * | 9/2008 | Krey | G09B 5/062 434/178 |
| 7,477,870 | B2 * | 1/2009 | Lane | G09B 5/06 434/317 |
| 7,904,922 | B1 * | 3/2011 | Haberman | G06Q 10/107 715/201 |
| 8,510,656 | B2 * | 8/2013 | Schwarz | G06F 3/0484 715/716 |
| 8,548,618 | B1 * | 10/2013 | Story, Jr. | H04N 21/439 700/94 |
| 8,596,640 | B1 * | 12/2013 | Kramlich | A63F 3/04 273/236 |
| 9,235,949 | B2 * | 1/2016 | Elliott | G07F 17/16 |
| 9,324,330 | B2 * | 4/2016 | Chordia | G10L 19/00 |
| 9,459,768 | B2 * | 10/2016 | Chordia | G06F 3/0482 |
| 9,934,817 | B2 * | 4/2018 | O'Shields | G11B 27/00 |
| 2002/0010584 | A1 * | 1/2002 | Schultz | G06F 3/16 704/270 |
| 2002/0081560 | A1 * | 6/2002 | Ka-Wah | G09B 5/00 434/317 |
| 2002/0163533 | A1 * | 11/2002 | Trovato | G10H 1/368 715/728 |
| 2003/0022143 | A1 * | 1/2003 | Kirwan | G09B 5/062 434/317 |
| 2003/0028380 | A1 * | 2/2003 | Freeland | G10L 13/00 704/260 |
| 2003/0182827 | A1 * | 10/2003 | Youngdahl | B42D 15/022 40/124.06 |
| 2004/0197757 | A1 * | 10/2004 | Musolf | G09B 5/06 434/308 |
| 2005/0039210 | A1 * | 2/2005 | Dusenberry | A63F 13/27 725/81 |
| 2005/0064374 | A1 * | 3/2005 | Spector | G09B 17/006 434/169 |
| 2006/0008781 | A1 * | 1/2006 | Townshend | G09B 17/006 434/178 |
| 2006/0112131 | A1 * | 5/2006 | Harrold | G06F 17/2276 |
| 2007/0244700 | A1 * | 10/2007 | Kahn | G10L 15/22 704/235 |
| 2009/0181598 | A1 * | 7/2009 | Baytman | A63H 3/50 446/484 |
| 2009/0282338 | A1 * | 11/2009 | Bohms | G06F 17/30265 715/719 |
| 2009/0316864 | A1 * | 12/2009 | Fitzsimmons | G06Q 10/10 379/88.13 |
| 2009/0326948 | A1 * | 12/2009 | Agarwal | G10L 13/033 704/260 |
| 2010/0031191 | A1 * | 2/2010 | Kim | G06F 17/30056 715/808 |
| 2010/0038894 | A1 * | 2/2010 | Haag | A63H 33/38 281/15.1 |
| 2010/0093434 | A1 * | 4/2010 | Rivas | A63F 13/12 463/35 |
| 2010/0267450 | A1 * | 10/2010 | McMain | A63F 13/56 463/30 |
| 2011/0046943 | A1 * | 2/2011 | Lee | G06F 17/27 704/9 |
| 2011/0107217 | A1 * | 5/2011 | Schwarz | G09B 5/062 715/716 |
| 2011/0246182 | A1 * | 10/2011 | Allen | G06F 17/248 704/9 |
| 2011/0246888 | A1 * | 10/2011 | Drucker | G06F 1/1626 715/716 |
| 2012/0035925 | A1 * | 2/2012 | Friend | G06F 3/167 704/235 |
| 2012/0088211 | A1 * | 4/2012 | Massaro | G09B 17/006 434/178 |
| 2012/0122531 | A1 * | 5/2012 | Aoki | G07F 17/3258 463/7 |
| 2012/0204086 | A1 * | 8/2012 | Stoner | G06F 17/30014 715/201 |
| 2012/0316952 | A1 * | 12/2012 | Huang | G06Q 30/0241 705/14.39 |
| 2013/0145240 | A1 * | 6/2013 | Anderson | G06F 3/0483 715/201 |
| 2013/0174026 | A1 * | 7/2013 | Locke | G06F 17/24 715/254 |
| 2013/0244127 | A1 * | 9/2013 | Maeshima | H01M 8/04089 429/432 |
| 2013/0244217 | A1 * | 9/2013 | Potts | G09B 5/02 434/324 |
| 2013/0268272 | A1 * | 10/2013 | Zhang | G10L 17/00 704/243 |
| 2014/0223272 | A1 * | 8/2014 | Arora | G09B 5/06 715/203 |
| 2015/0363481 | A1 * | 12/2015 | Haynes | G06Q 10/10 707/748 |
| 2017/0243517 | A1 * | 8/2017 | Midmore | G09B 19/06 |

OTHER PUBLICATIONS

Guile 3D Studio Virtual Assistant Denise User Manual, 2010 http://guile3d.com/en/help/manual/guile3dstudio-usermanual.pdf.*
Sparklefish; Wired; Jun. 8, 2011; "Sparklefish: Weird Name, Great Fun"; https://www.wired.com/2011/06/sparklefish-weird-name-great-fun/ (Year: 2011).*
PR Web, Whosagoodboy Releases SparkleFish—The Audio Story Completion Game for iPhone, iPad, and iPod Touch, http://www.prweb.com/releases/2011/5/prweb8411229.htm., dated Nov. 7, 2012, pp. 1-2.
Non-Final Office Action dated Mar. 3, 2014 in U.S. Appl. No. 13/488,070, 13 pages.
Non-Final Office Action dated Sep. 9, 2014 in U.S. Appl. No. 13/488,070, 6 pages.
Notice of Allowance dated Jan. 5, 2015 in U.S. Appl. No. 13/488,070, 7 pages.

* cited by examiner

FILL-IN-THE-BLANK AUDIO-STORY ENGINE

CROSS-REFERENCE TO RELATED APPLICATIONS

The present application is a continuation of U.S. patent application Ser. No. 13/488,070 filed Jun. 4, 2012, entitled "Fill-In-The-Blank Audio-Story Engine," which is incorporated by reference herein in its entirety.

BACKGROUND

Children and adults alike enjoy creating fill-in-the-blank stories. Fill-in-the-blank stories allow people to add names, places, and activities to blanks in a prewritten story. When read together, the prewritten story and the supplied names, places, and activities create a personalized story that can be very humorous.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention are generally directed to an Audio-Story Engine that includes, generally, a repository of prerecorded audio files that, when played in a certain sequence, with user provided recordings placed throughout, tell a story. To obtain the user provided recordings, the Audio-Story Engine asks the user to make audio recordings of various words or phrases. For example, the Audio-Story Engine may ask the user to record a series of names, colors, nouns, verbs, favorite places, etc. The Audio-Story Engine then records and stores the user's audio recordings. An appropriate user recording is played after a prerecorded audio file. This is repeated several time in sequence to form a seamless, customized, audio story. In addition, the Audio-Story Engine may alter the pitch or sound of the user's recorded words to match the pitch of the prerecorded story.

The Audio-Story Engine may provide several different prompts/questions applicable to each desired user recording. The multiple questions could be selected randomly to assist with creating the prerecorded story. In one embodiment, the user could provide multiple answers to the same prompt/question and the Audio-Story Engine could select from the answers. For example, the user may record multiple names, and the Audio-Story Engine randomly picks names to add to the prerecorded story.

The Audio-Story Engine may be built into an human-shaped object or other physical object that may be passed around. The object will include various buttons that allow the user to control game play. The Audio-Story Engine may include a "try me" mode/feature that allows the user to try out the object before purchasing by recording a single input. In the "try me" mode, the Audio-Story Engine inserts one or more sample user inputs into a single prerecorded story and plays the resulting sample story with the sample user inputs once. The sample user inputs are then made inaccessible to prevent audio vandalism. In one implementation, the Audio-Story Engine may take the form of a smart phone application.

BRIEF DESCRIPTION OF THE DRAWINGS

Embodiments of the invention are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are generally directed to an Audio-Story Engine that includes, generally, a repository of prerecorded audio files that, when played in a certain sequence, with user provided recordings placed throughout, tell a story. To obtain the user provided recordings, the Audio-Story Engine asks the user to make audio recordings of various words and/or phrases. For example, the Audio-Story Engine may ask the user to record a series of names, colors, nouns, verbs, favorite places, etc. The Audio-Story Engine then records and stores the user's audio recordings. An appropriate user recording is played after a prerecorded audio file. This is repeated several time in sequence to form a seamless, customized, audio story. In addition, the Audio-Story Engine may alter the pitch or sound of the user's recorded words to match the pitch of the prerecorded story.

The Audio-Story Engine may provide several different prompts/questions applicable to solicit each desired user recording. The multiple questions could be selected randomly to assist with creating the prerecorded story. In one embodiment, the user could provide multiple answers to the same question and the Audio-Story Engine could select from the answers during playback. For example, the user may record multiple names, and the Audio-Story Engine may randomly pick from the names to add to the prerecorded story.

The Audio-Story Engine may be built into an human-shaped object or other physical object that may be passed around. The object will include various buttons that allow the user to control game play. The Audio-Story Engine may include a "try me" mode/feature that allows the user to test the functionality of the object before purchasing by recording a single trial input. In the "try me" mode, the Audio-Story Engine inserts the user input into a single prerecorded story and plays the sample story once. The input for the sample story is then made inaccessible to prevent audio vandalism. In one implementation, the Audio-Story Engine may take the form of a smart phone application.

Story-Building Overview

Embodiments of the present invention allow a user, or multiple users, to build a fill-in-the-blank audible story. When multiple users work together to build a story, the users can pass the game controller around and take turns answering questions or completing the required steps. In one embodiment, the story building engine is explicitly told how many users are working together to build a story. In this situation, the questions, which will be described in more detail subsequently, may be tailored specifically to the number of users. For example, the same question could be asked to each individual and an audible answer received and stored from each individual. In another example, different questions are directed to individual users.

In one embodiment, to start the story building process, a user pushes the start-story button. Pushing the start-story button resets the story engine and prepares the game console for the generation of a new story. As part of this process, all previously recorded answers are deleted. Upon receiving a request to start a new story, the story engine picks a template story to serve as the framework for building the audible fill-in-the-blank story. The template story comprises an audio recording of the base story. The audio recording has a series of gaps (akin to blanks or spaces) within the story that need to be filled-in with user answers. In one embodiment, the template story actually comprises a series of ordered story snippets (i.e., a plurality of complete audio files that are played in a desired sequence with user provided audio files interspersed at various points during playback). At the end of each snippet, a user answer is inserted. In this case, the final story is built by adding or playing the first story snippet, the first answer, the second snippet, the second answer, and so on. In another embodiment, the template is a single audio file with designated points into which user answers are spliced or played.

The audio-story engine will have multiple template stories from which the audio engine may select. In one embodiment, the audio engine selects stories sequentially. For example, the first time the story engine is used, the first story is selected. The second time the story engine is used, the second story is selected. Once the last story is reached, the process starts over and the first story is selected.

In another embodiment, stories are randomly selected. In another embodiment, stories are semirandomly selected. The semirandom process removes a few stories from the corpus of template stories and then randomly selects one of the remaining stories. For example, the three most recently used stories may be removed from the corpus and one of the balance of stories are then randomly selected to create the template story. In this scenario, the story selection is somewhat random, but repeating a recently used story template is avoided.

In another embodiment, a lottery system is used to select a template story. The lottery system assigns points to a story each time it is not selected. The more points assigned to a story, the higher probability the story has of being selected. In this case, a story selection is somewhat unpredictable and stories that have not been used are the most likely to be selected, but any story could potentially be selected. Various combinations on these methods are possible. For example, the lottery method could be used while eliminating a threshold number of the most recently used stories from the selection process.

Upon selecting the template story, the game console outputs a series of start-new-story prompts. In general, the start-new-story prompts provide an overview of the selected story and instructions for completing a story. For example, the first game prompt may output a message such as "Hi! I'm the story elf. I have a very important job at the North Pole. I'm in charge of all the holiday stories and I need your help to tell them! I'll tell you what kinds of words I need, you say them for me, I'll record them, and then I'll tell you a story with those words in it!"

The next new-story prompt might read or recite "press the questions button to start playing now, or keep listening to learn how." If they push the questions button, then the game play will start according to the rules described below.

If the user does not push the question button at this point, the story building engine provides more instructions to the user describing how to build the story. The instructions become increasingly detailed and may provide examples. For example, a subsequent story instruction might read "Here's how it works . . . I'll ask you a question or give you instructions like 'tell me your favorite thing to eat.' You might say, 'chocolate chip cookies.' I'll record your answer to this and even more questions. Once you've answered all my questions, press the play story button and I'll tell you a story with chocolate chip cookies and all of your other answers in the story. The best part is your voice will sound like an elf, too! Pass me around for everyone to play! Sounds fun, wouldn't you say! Here's what a line from your story might sound like . . . . " At this point, a simulated story snippet would be played that included "chocolate chip cookies" and other fake recordings to demonstrate what part of a resulting story might sound like and to simulate a resulting story that could occur during the story building process. Finally at the conclusion of the new story prompts, an audible instruction to press the questions button to begin is output. In embodiments where the story building engine is an application on a computing device with a display, written prompts and examples may be displayed, in addition to the audible prompts, to help the user build a fill-in-the-blank story.

With each button, different interrupt settings may be used. The interrupt settings specify what happens when buttons are pushed out of order, or while other parts of the story building process are underway. Exemplary interrupt handling includes resetting the game anytime the start button is pushed. This includes pushing the start button when the start-story prompts are underway. In this case, the game would be reset and a new story selected and the previously described process repeated. In this way, the user can abandon the creation of a story that is not of interest at anytime in the process.

The next portion of the story building process is to solicit answers to questions from users. This process may be guided by a question button. A new question may be presented in response to the user pushing the question button. When the question button is pushed, the story engine determines what blank needs to be filled in next within the active or enabled story template. The order in which the blanks are populated may be randomized. Further, for each blank in the story there may be multiple questions that are suitable for eliciting an appropriate answer. These questions may take several different forms and may be randomized as well. Thus, the question selection process is randomized in at least two different ways within an embodiment of the present invention. First, the next blank within the story to fill is randomly selected and then one of multiple questions suitable for eliciting an answer that may be used in the blank is randomly selected.

Prior to actually outputting the question, a question prompt may be played that recites instructions similar to "It's time to ask you some questions! Let's get started. Here's your first question." After asking the question, an instruction for answering the question may be played. For example, the instruction may state "Press and hold the record button and tell me your answer after the beep. Release the button as soon as you're done talking!"

As mentioned, different questions can be used to elicit similar information. For example, if a blank calls for a type of food, the command "Tell me your favorite thing to eat" may be selected or, alternatively, the command "tell me something you would find in a lunch sack" could be used.

Upon receiving an answer, the prompt "If you want to rerecord your answer, press and hold the record button again" may be played. If the user then pushes the record button again, the previous answer is deleted and the new answer is associated with that blank in the story. Upon receiving a good answer, a prompt stating "Good answer! Press the questions button again to hear your next question!" may be played. After the users appear to get the hang of the process, the prompt may simply state "Good answer! Next question!" In other words, as the process progresses the prompt's complexity or length may decrease to speed the process. Further, various process update prompts may be played. The process update prompts explain to the user where they are in the process of building a story. For example, the last question/comment prompt may recite "It's your last one! Make it good!" The halfway prompt may recite "I've got just a few more for you! You're doing great!"

Various error recordings may be played when needed. For example, when the user pushes the record button without pushing the question button, the prompt "Oops! Press the question button first!" may be played. When a poor quality audio recording is detected, the prompt "Oopsy! I didn't quite hear you! Try again!" may be played. All of the instructions provided above are simply exemplary and intended to illustrate possible questions, commands or prompts that can elicit appropriate responses.

As with the start button, the "question" and "record" buttons have interrupt handling associated with them. For example, pressing the question button during the playback of a start-new-story prompt will interrupt the new-story-prompt sequence and go directly to the first question. Pressing the question button during story playback will have no effect. In other words, the question button is disabled during playback of the story. Pressing the question button after the story playback is finished, but before the start button is pressed, will reset the game and go directly to step one of the play questions sequence. In other words, the user can build a new fill-in-the-blank story with the same selected template by pushing the question button after the story is played. Alternatively, pressing the question button after story playback is complete advances the game to the next story template, rather than allowing the previous story to be populated again with a new set of answers.

The interrupt handling for the record button may be set up so that pushing the record button during playback of any question will have no effect. In other words, the record button is disabled during playback. Pressing the record button during playback of any recorded answer or during, or after, playback of any prompts will start the rerecording process at the current question. Pushing the record button while playing a good answer prompt, the midway prompt, or the last question prompt will cause the record process to start again.

At the conclusion of recording all of the answers, a play-story prompt may instruct the user to push the "play" button to hear the story. If the record button is pushed during the play-story prompt, then the latest question may be rerecorded.

Continuing with the record button interrupt instructions, pressing the record button after the start button is pressed but before any questions have been asked should cause the "question first" prompt to play instead of starting the recording process. As mentioned, the "question first" prompt instructs the user to push the question button before attempting to record an answer. Pressing the record button after previous story playback is finished, but before a start button is pressed, will cause the "play story" prompt to be played. In other words, the user may be instructed to push the play button to play the story again after pushing the record button when a story recording is completed.

Figure 1:
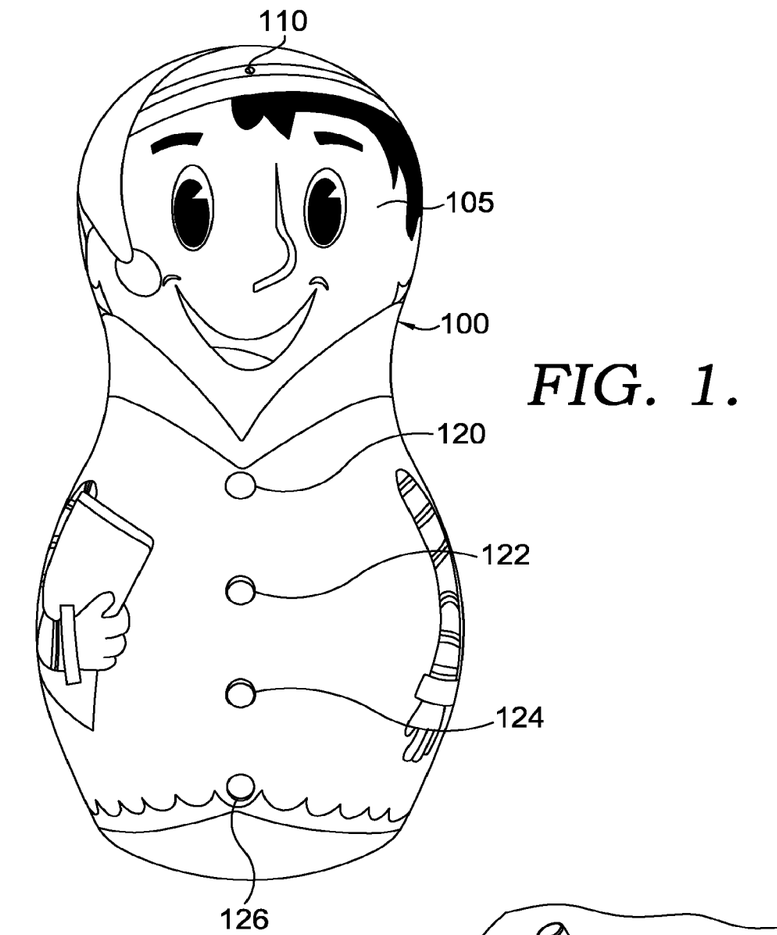
FIG. 1 is a side elevation view illustrating a human-shaped audio game controller, according to an embodiment of the present invention.
Figure 2:
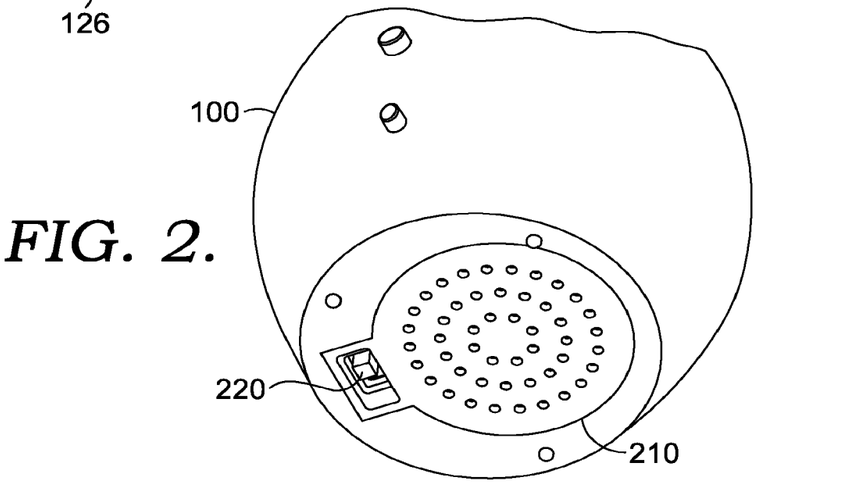
FIG. 2 is a bottom perspective view of the game controller of FIG. 1, in accordance with an embodiment of the present invention.
Figure 3:
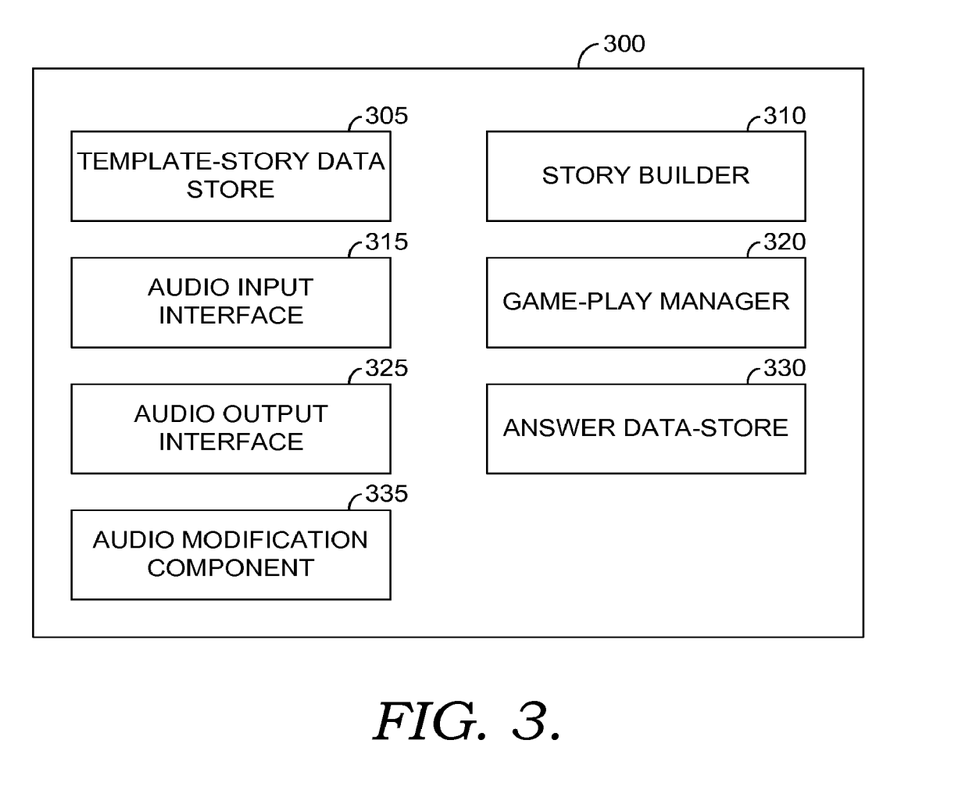
FIG. 3 is a diagram of an exemplary game-controller computing environment, in accordance with an embodiment of the present invention.

An Exemplary Game Console (FIGS. 1-3)

Turning now to FIG. 1, a front side elevation view of an elf-shaped audio story game console 100 is shown, in accordance with an embodiment of the present invention. The game console 100 helps a user build a fill-in-the-blank story, as described above. As mentioned, embodiments of the present invention are not limited to embodiments taking the form of an elf or even a figure of any type. Embodiments of the present invention could be incorporated into any type of figure, a game console, an online application, or a phone. In the phone example, an embodiment of the present invention could take the form of an application installed on the phone.

The game console 100 shown in FIG. 1 has decorations 105 that give the game console 100 the appearance of an elf together with the game console's shape. The game console 100 may be constructed of plastic or another suitable material. The game console 100 houses electronics (not shown) that form a computing device. Portions of the computing device may include a power supply, a processor, computer memory, computer storage, I/O interfaces, and WIFI or Bluetooth radios. The computing device has access to computer-executable instructions that when executed perform a method through which a fill-in-the-blank story is generated. Individual functions of the computer-executable instructions and computing device will be described in more detail with reference to FIG. 3. The combination of electronics and computer instructions may be described as a fill-in-the-blank story-building engine.

The game console 100 includes a microphone 110. The microphone is used to receive audible answers from users. The microphone 110 is communicatively coupled to the computing device to transfer the sounds received at the microphone 110 to the computing device for inclusion in the story.

The game console 100 also includes several function buttons. The function buttons include a start-game button 120, a question button 122, an answer button 124, and a play-story button 126. Each button has one or more functions that have been described in more detail within the game play overview section above. Each button is communicatively coupled to the computing device within the game console 100. The buttons form a user interface through which the user controls the story-building process. The buttons may or may not include markings thereby on the game console to indicate the function of the buttons.

Turning now to FIG. 2, a fragmentary, bottom perspective of the game console 100 is shown, in accordance with an embodiment of the present invention. The bottom perspective shows a speaker 210 and a power switch 220. The speaker 210 outputs audible prompts/commands/questions and completed stories among other audible outputs. The speaker 210 is coupled to the computing device within the game console 100. The power switch 220 is used to turn on or turn off the game console 100. In one embodiment, the game console has a sleep mode that is entered after no interactions are detected for a threshold amount of time.

As mentioned, embodiments of the present invention may take the form of a virtual game console that is generated by a computer application. In this case, the function buttons may be soft buttons selected through a computer interface rather than physical buttons on a device. Further, the microphone and speaker may be communicatively coupled or part of a device that is running the application.

The Game Controller

Turning now to FIG. 3, an exemplary game-controller computing environment 300 is shown in accordance with an embodiment of the present invention. Computing environment 300 is but one example of a suitable computing environment and is not intended to suggest any limitation as to the scope of use or functionality of the invention. Neither should the computing environment 300 be interpreted as having any dependency or requirement relating to any one or combination of components illustrated.

Embodiments of the invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

Computing environment 300 typically includes a variety of computer-readable storage media. By way of example, computer-readable storage media may comprise Random Access Memory (RAM); Read Only Memory (ROM); Electronically Erasable Programmable Read Only Memory (EEPROM); flash memory or other memory technologies; Compact Disk Read-Only Memory (CDROM), digital versatile disks (DVDs) or other optical or holographic media; magnetic cassettes, magnetic tape, magnetic disk storage or other magnetic storage devices; or any other medium that can be used to encode desired information and be accessed by a computing device. The computer-readable storage media may be nontransitory.

The exemplary computing environment 300 comprises a template-story data store 305, a story builder component 310, an audio input interface 315, a game-play manager 320, an audio output interface 325, an answer data store 330, and an audio-modification component 335.

The template-story data store 305 stores a collection of computer readable audio story templates. The audio story templates comprise a recorded audio story with blanks that may be filled in by user answers. The template-story data store 305 may comprise numerous template stories. The stories may be indexed for easy identification. Though described as a single template story, an individual template story may be a combination of multiple audio files. The multiple audio files may be spliced or played sequentially together with user answers to form a finished story. The template stories may be recorded with different audio characteristics. In one example, stories are recorded to sound like an elf. In another example, stories may have the audio characteristics of a well-known person. An individual template story may be recorded with different audio characteristics that the user can specify. For example, the user could select the audio file that sounds like a fairy godmother one time and an elf the next time.

The story builder component 310 builds a completed fill-in-the-blank story. The story builder component 310 may build the story by merging the template story with user answers from the answer data store 330. The story builder component 310 may select a template story and may select from multiple answers that are suitable for a particular blank within the template story. The story builder component 310 may also interact with the game-play manager 320 to output appropriate questions for a selected template story. In this case, the story builder component 310 may choose from multiple questions that are suitable to elicit a particular type of information needed for a blank within the fill-in-the-blank story. The specific question may be randomly selected from the multiple questions that could be used to elicit an audio response that could be used to fill in a given blank. Programming logic may be used to ensure that the same prompt questions are not utilized in consecutive stories such that several stories may pass before a given question is asked again.

The audio input interface 315 receives audio inputs from a user. The audio answers may be evaluated to determine whether it is a good answer. A good answer may be one that is recorded above a threshold sound level. Other characteristics of the user answer that could make it a good or bad answer may include being of a minimum length, being of a length that fits within a selected time range (e.g., between 6-8 seconds), falling within a certain pitch range, missing dead space or silence recorded before or after audible sounds (if found, the recording may be shortened to strip out the dead space), etc. The audio input interface 315 may perform the good answer analysis or pass the answer on to the game-play manager 320 or story builder component 310 to perform the evaluation. Eventually, the audible answers are communicated to the answer data store 330.

The audio output interface 325 outputs audible answers to the user. The audio output interface 325 may be coupled to a speaker, headphones, or other hardware device capable of generating sounds. The audio output interface 325 may receive instructions from the game-play manager 320. Similarly, the audio output interface 325 may receive a completed story or other instructions for audio output from the story builder component 310.

The game-play manager 320 manages the construction of the audio fill-in-the-blank story. The game-play manager 320 interacts with the various buttons or inputs described previously. The game-play manager 320 moves the story-building process from the start story through the question and recording phase until a completed story is generated. The game-play manager 320 works with the other components as part of the story-building process. For example, the game-play manager may receive audible answers from the audio input interface 315 and communicate instructions through the audio output interface 325.

The answer data store 330 stores user answers. The user answers may be spliced into a completed story by the story builder component 310.

The audio modification component 335 modifies user answers to conform with the audio characteristics of the template story. As mentioned, in one embodiment, the user answers could be raised in pitch to sound like an elf. The modified user answers could be stored in the answer data store 330.

Figure 4:
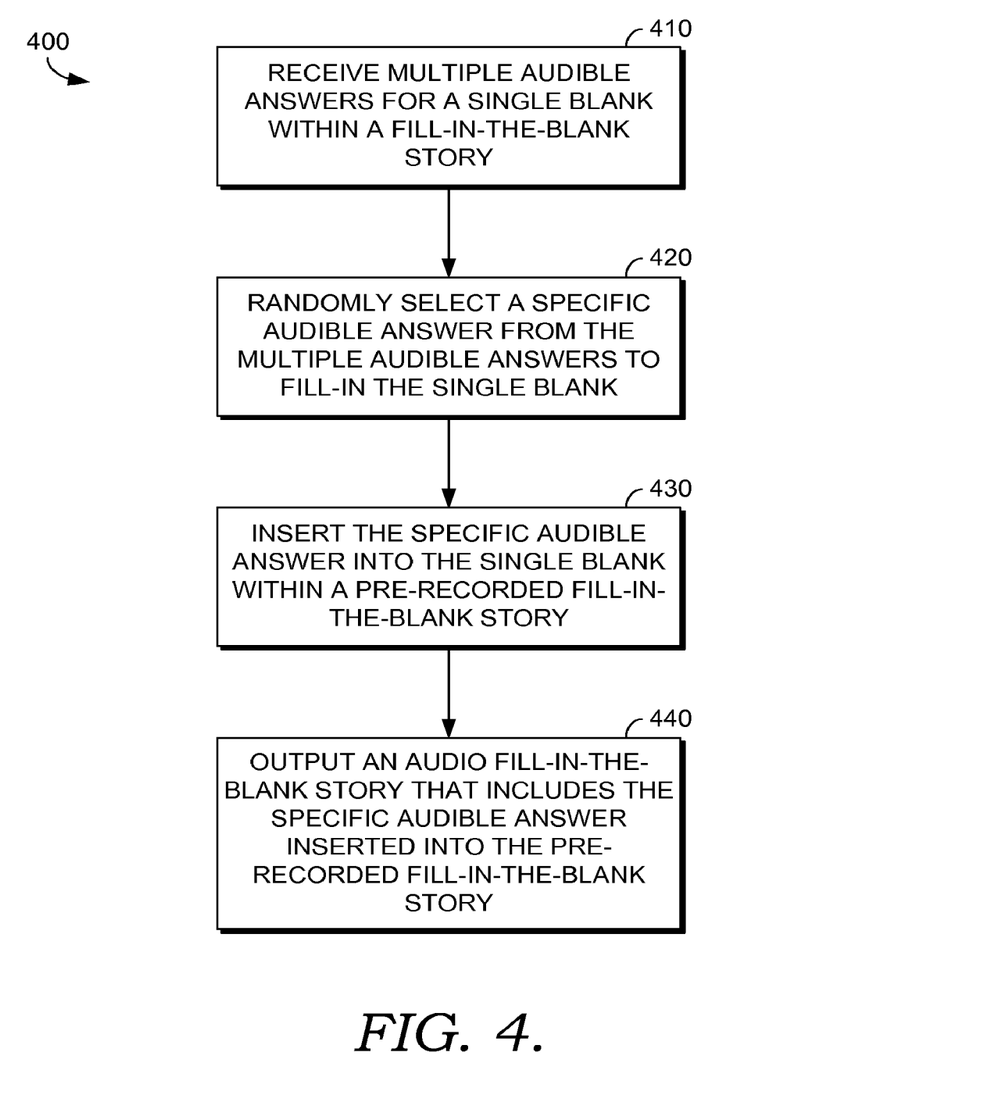
FIG. 4 is a flow chart showing a method of building an audio fill-in-the-blank story, in accordance with an embodiment of the present invention.

Turning now to FIG. 4, a method of building an audio fill-in-the-blank story is described, in accordance with an embodiment of the present invention. The method may be performed on a computing device executing computer executable instructions. For example, a method 400 could be executed or performed by a game console shaped like an elf having an internal computing component suitable for performing the method.

At step 410, multiple audible answers for a single blank within a fill-in-the-blank story are received. The multiple audible answers may be received through a microphone. The audible answers may be spoken by one or more users. For example, a game console could be passed around to multiple users who record answers to question prompts.

At step 420, a specific audible answer is randomly selected from the multiple audible answers to fill in the single blank. As mentioned previously, during the game process, multiple answers that are suitable for a single fill-in-the-blank within the fill-in-the-blank story are collected. One of these answers is randomly selected for the single blank in one embodiment of the present invention.

At step 430, the specific audible answer is inserted into the single blank within a prerecorded fill-in-the-blank story. As mentioned, this process may involve stacking story parts and user answers. For example, the first story part could be played and the first answer could be played, the second story part could be played and then the second answer could be played, and so on until the story is completed. In one embodiment, the specific audible answer is altered to sound like the recorded or prerecorded fill-in-the-blank story.

At step 440, an audio fill-in-the-blank story that includes the specific audible answers inserted into the prerecorded fill-in-the-blank story is output. The story may be output to a device capable of projecting the sound to a user.

Figure 5:
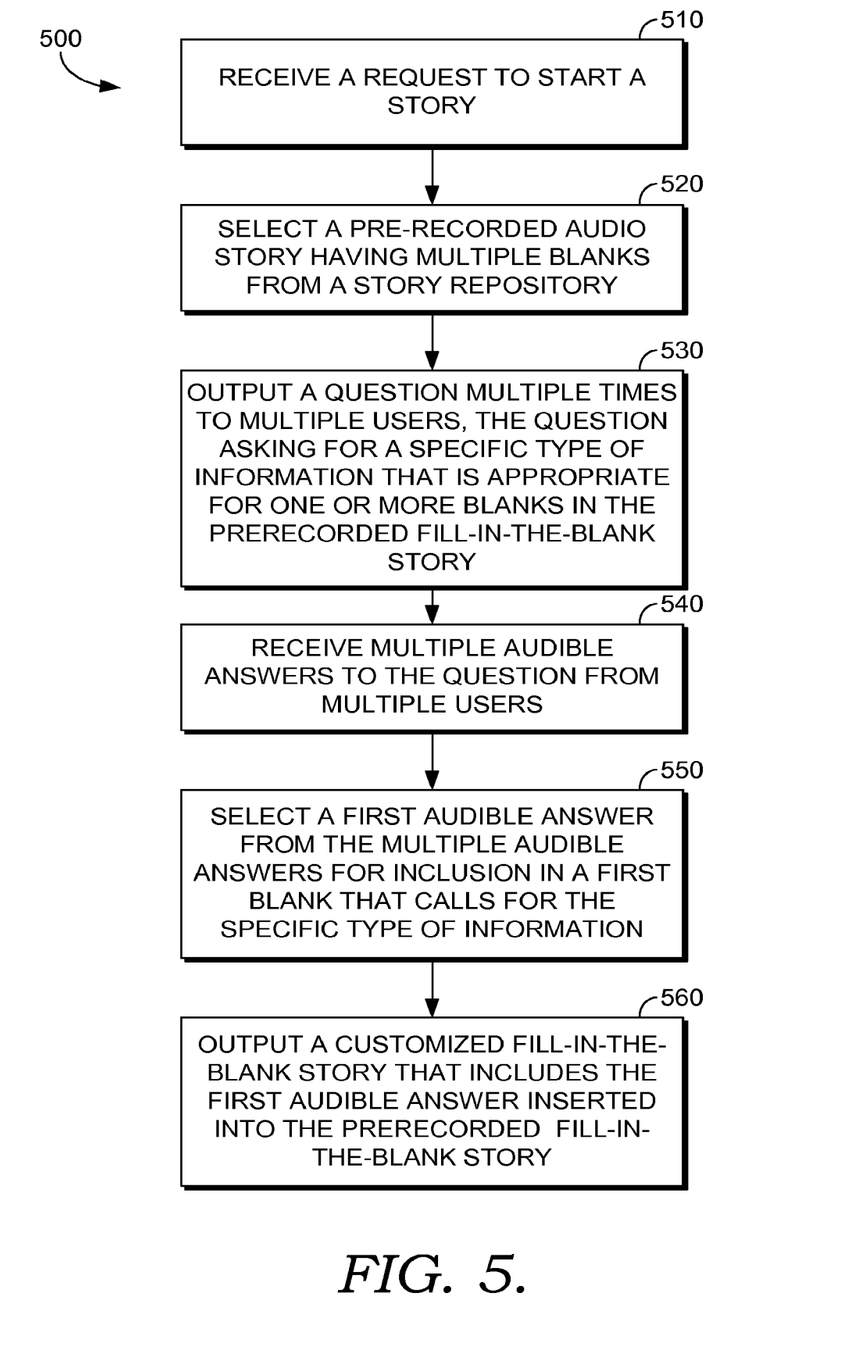
FIG. 5 is a flow chart showing another method of building an audio fill-in-the-blank story, in accordance with an embodiment of the present invention.

Turning now to FIG. 5, a flow chart showing a method of building a fill-in-the-blank audio story is shown, in accordance with an embodiment of the present invention. At step 510, a request to start a story is received. The request may be received through a user pushing a button on a game console. In another embodiment, the user may provide inputs on a user interface directing the generation of the audio story.

At step 520, a prerecorded audio story having multiple blanks is selected from a story repository. As mentioned previously, the prerecorded audio story may be selected randomly. In another embodiment, the prerecorded audio story is selected sequentially from a list or index of audio stories. In another embodiment, a user is able to specifically view titles of the prerecorded audio stories and select a specific story. For example, the names of the stories may be displayed on a smart phone or other computing device performing the method 500.

In one embodiment, the prerecorded audio story is selected by combining story components to form a single story. For example, the story could be selected by choosing a story introduction, a main story, and a conclusion from a group introductions, main stories, and conclusions. In this way, selecting the story actually involved building a story from constituent story parts. This embodiment increases the number of potential audio stories that can be produced.

At step 530, a question is output multiple times to multiple users. The question asks for a specific type of information that is appropriate for one or more blanks in the fill-in-the-blank audio story. As mentioned, multiple questions may be used to elicit similar answers that are suitable for one or more blanks within a story. For example, a first question could ask for the city in which a user was born. Another question could ask for the capitol of the state in which they live. In both cases, the name of a city should be the response. This response would be suitable for any blank calling for the name of a city.

At step 540, multiple audible answers to the question are received from multiple users. The answer for each user may be stored for later combination into the story. In one embodiment, the user's answers are stored in association with a user identification assigned to the user. In one embodiment, users are located remotely from each other and the story game console is centrally located on a server or other device accessible via a network. In this case, the users may log on to the site and supply their answers through a webcam or other input device on the computing device they use to access the central game control component.

At step 550, a first audible answer from the multiple audible answers is selected for inclusion in a first blank that calls for the specific type of information. At step 560, a customized fill-in-the-blank story is output. A completed story includes the template story combined with the selected audible answers.

Other game versions or embodiments are contemplated by the invention. For example, instead of simply prompting a user to record a response that is a word or a phrase, the Audio-Story Engine may prompt the user to record a sound effect or a noise (e.g., "Moo like a cow" or "Make a farm animal sound"). The sound effect can be inserted in the story at an appropriate time to enhance the story. Similarly, the prompt can be music and ask the user to complete the next words in the song. The prompt will play the first part of the line of a song and then stop while recording the user finishing the line.

In another embodiment, the theme could be movie trailers and users would be asked to help create the trailer. Accordingly, the template story would be movie related and the recordings can be multiple characters in the movie. To accomplish this, the prompts could suggest ways to say the response (e.g., "In a mean voice, say someone's name"). Alternatively, the user recorded response could have the pitch changed up or down to fit the different characters. In this way, one user could provide multiple voices.

In yet another embodiment, instead of using the recordings to piece together a story, the recordings can be used to piece together a song. A pre-recorded song could have instrumentals throughout and pre-recorded vocals in certain locations. The user recorded responses could be modified not only in pitch, but also in melody to match the melody in the location of the song that they are being inserted. This would convert the user recorded speech into music vocals, song or singing (i.e., the user can talk normal and their recorded response is modified to follow or match the melody where it will be inserted or overlaid in the pre-recorded song). Alternatively, instead of omitting pre-recorded lyrics in a location where a user recorded response is played, the pre-recorded lyrics may be reduced in volume to act more as background vocals.

In still another embodiment, the user recorded response may be played along with additional pre-recorded sounds to make the user recorded message blend in better with the pre-recorded story pieces. For example, if the theme is a stand up comedy routine and the pre-recorded story pieces have crowd or ambient noise in the background, the insertion of a user recorded response that was recorded in a silent room would stand out even if it was pitch modified to match the pitch of the pre-recorded story pieces. Accordingly, when played back and inserted into the story, crowd noise similar to that in the pre-recorded story pieces could be played simultaneously with and during the playback of the user recorded response.

In yet another embodiment, two versions of the Audio-Story Engine may interact or communicate with each other. For example, one version of the Audio-Story Engine running on a smart phone may interact with and communicate with a stand alone version of the Audio-Story Engine in a handheld toy device. The communication can be wired or wireless, such as by radio frequency or infrared, but may also be by ultrasonic or audible means embedded in the recording such that playback of the completed story on the smart phone device could activate the toy device and cause it to respond, move, or otherwise unlock hidden functions in the toy device. In one embodiment, a user of the smart phone version could use commands on the phone to initiate playback of a completed story on the toy version/device.

Other features may be added to the Audio-Story Engine to make it more versatile and user-friendly. For example, an archive feature may be provided to allow for the storing of a fully created story with the user provided audio answers therein. The saved story can then be played on the device at a later time or may be transmitted or downloaded as an audio file to another device, such as a digital music player, tablet, smart phone, computer, etc. for further playback and/or retention.

As another example, the game may be updated. In one embodiment the multiple template stories are located or stored on permanent internal memory. In another embodiment the multiple template stories are stored on removable memory, such as a memory card. This embodiment would allow owners of the game console to update the game console from time to time to include new templates that are used to create new stories. The user could purchase a new memory card with multiple new template stories thereon and insert it in the game console. Alternatively, new template stories may be downloaded to the game console via wired or wireless means.

While the game has been disclosed with template stories that are designed to be funny or fantasy type made up stories, the game is not limited to such embodiments. For example, template stories may be provided to assist a user in telling a real, personal story, with the user providing their own specifics to the story. This would help them create and construct a real-life narrative. For example, the prompts could be about the user's first car. The template would then be related to that subject and the user's recorded answers would be inserted into the template to create a narrative about the user's first car. Similarly, a mix of the two versions could be used. The user could be prompted for real life answers, but they could be inserted into a story to create a funny narrative using real life answers. In yet another embodiment, the game could be used to prompt users, such as in a group, to have discussions related to the template story. For example, during the prompt and record session, or after the playback of the compiled completed story, the device could give instructions or prompts to direct the users to share a true story related to the template story. For example, if the template story was about an adventure a young child had exploring, the device could prompt the users, after playing the story to go clockwise around the group and tell a real story they remember about an adventure they had as a child. This would encourage interaction among the group and help them engage in an enjoyable and meaningful discussion.

CONCLUSION

Accordingly, the present invention discloses a game console capable of incorporating user answers into an audio fill-in-the-blank story. Many variations can be made to the illustrated and described embodiments of the present invention without departing from the scope of the present invention. Such modifications are within the scope of the present invention. For example, the game console need not be an elf, but could be an application executed by a smart phone or some other wearable or holdable item. Other modifications would be within the scope of the present invention.

From the foregoing it will be seen that this invention is one well adapted to attain all ends and objects hereinabove set forth together with the other advantages which are obvious and which are inherent to the method and apparatus. Embodiments of the invention have been described to be illustrative rather than restrictive. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

The invention claimed is:

1. One or more nontransitory computer-readable media having embodied thereon computer-usable instructions for generating a fill-in-the-blank audio story which, when executed by one or more computing devices, performs steps comprising:
    storing a prerecorded audio story, comprising a voice telling a story, which omits words between portions of the prerecorded audio story, wherein each omitted word corresponds to a blank;
    prior to outputting the fill-in-the-blank audio story:
        (1) presenting a plurality of prerecorded questions that correspond to respective blanks within the prerecorded audio story, and
        (2) receiving and storing within an answer data store multiple audible answers to each question, in a user's voice, via an audio input interface coupled to a microphone, for each respective blank within the prerecorded audio story;
    for each respective blank, utilizing a computer-generated function to randomly select a specific audible answer from the multiple audible answers stored within the answer data store for the blank;
    for each respective blank, inserting the specific audible answer into the blank within the prerecorded audio story; and
    subsequent to receiving the multiple answers to each question, outputting, via an audio output interface coupled to a speaker, the audio fill-in-the-blank story that includes the specific audible answers inserted into the respective blanks.

2. The media of claim 1, the steps further comprising outputting an audio prompt soliciting the multiple audible answers for the blank.

3. The media of claim 1, the steps further comprising building the prerecorded fill-in-the-blank story from multiple prerecorded story portions that are interchangeable.

4. The media of claim 3, wherein building the prerecorded fill-in-the-blank story comprises:
 selecting an introduction portion of the prerecorded fill-in-the-blank story from a first group of prerecorded story portions that are interchangeable with each other;
 selecting a main body portion of the prerecorded fill-in-the-blank story from a second group of prerecorded story portions that are interchangeable with each other; and
 selecting a conclusion portion of the prerecorded fill-in-the-blank story from a third group of prerecorded story portions that are interchangeable with each other.

5. The media of claim 1, the steps further comprising altering one or more audio characteristic of the specific audible answers in the user's voice to conform with one or more audio characteristic of the voice telling the prerecorded audio story.

6. The media of claim 5, wherein altering the audio characteristics comprises changing a pitch of the audio of the specific audible answer in the user's voice to match a pitch of the prerecorded audio story.

7. One or more nontransitory computer-readable media having embodied thereon computer-usable instructions for generating a fill-in-the-blank audio story that includes a plurality of blanks, which, when executed on a computing device that includes a microphone, a speaker, a user interface, and one or more processing devices, perform steps comprising:
 providing a plurality of stored questions, wherein each blank in a prerecorded fill-in-the-blank story is associated with multiple questions;
 for a first blank, utilizing a computer-generated function to randomly select a question from the multiple questions associated with the first blank;
 presenting the question;
 in response to receiving one or more record answer instructions, recording multiple audible answers for the question in a user's voice, via an audio input interface coupled to the microphone, for the first blank within the prerecorded fill-in-the-blank story;
 utilizing a computer-generated function to randomly select a specific audible answer from the multiple audible answers for the first blank;
 inserting the specific audible answer into the first blank within the prerecorded fill-in-the-blank story;
 repeating the above steps for a plurality of blanks within the prerecorded fill-in-the-blank story; and
 subsequent to recording the multiple audible answers for the plurality of blanks, outputting, via an audio output interface coupled to the speaker, the audio fill-in-the-blank story that includes the specific audible answers inserted into the prerecorded fill-in-the-blank story.

8. The media of claim 7, the steps further comprising outputting an audio prompt soliciting the multiple audible answers for the first blank.

9. The media of claim 7, the steps further comprising building the prerecorded fill-in-the-blank story from multiple prerecorded story portions that are interchangeable.

10. The media of claim 9, wherein building the prerecorded fill-in-the-blank story comprises:
 selecting an introduction portion of the prerecorded fill-in-the-blank story from a first group of prerecorded story portions that are interchangeable with each other;
 selecting a main body portion of the prerecorded fill-in-the-blank story from a second group of prerecorded story portions that are interchangeable with each other; and
 selecting a conclusion portion of the prerecorded fill-in-the-blank story from a third group of prerecorded story portions that are interchangeable with each other.

11. The media of claim 7, wherein the prerecorded fill-in-the-blank story includes a plurality of voices representing different characters in the prerecorded fill-in-the-blank story, and wherein the steps further comprise:
 altering the specific audible answer for the first blank to sound like a first voice representing a first character in the prerecorded fill-in-the-blank story, and altering a specific audible answer for a second blank to sound like a second voice representing a second character in the prerecorded fill-in-the-blank story.

12. The media of claim 11, wherein the altering comprises changing a pitch of the specific audible answer to match a pitch of the prerecorded fill-in-the-blank story.

13. One or more nontransitory computer-readable media having embodied thereon computer-usable instructions for generating a fill-in-the-blank audio story which, when executed by one or more computing devices, perform steps comprising:
 receiving, via a user interface, a request to start a story;
 selecting, from a story repository, a prerecorded fill-in-the-blank story having multiple blanks for user answers;
 for a first blank, selecting, from a set of pre-stored questions, a question that is specific to the first blank;
 outputting the question multiple times, via an audio output interface, wherein the question asks for a specific type of information that is appropriate for the first blank in the prerecorded fill-in-the-blank story;
 receiving, via an audio input interface, an answer to the question each time the question is output, wherein multiple audible answers to the question in a user's voice are received and stored;
 randomly selecting a first audible answer from the multiple audible answers for inclusion in the first blank that is associated with the question; and
 outputting, via an audio output interface, a customized fill-in-the-blank story that includes the first audible answer inserted into the prerecorded fill-in-the-blank story.

14. The media of claim 13, wherein receiving the request to start the story comprises receiving a communication that a button was pressed.

15. The media of claim 13, wherein receiving the request to start the story comprises receiving a communication that a soft button was selected.

16. The media of claim 13, wherein the steps further comprise, prior to receiving each of the multiple audible answers, receiving a record answer instruction via the user interface.

17. The media of claim 13, wherein the steps further comprise building the prerecorded fill-in-the-blank story from multiple prerecorded story portions that are interchangeable.

18. The media of claim 13, wherein the steps further comprise receiving a selection of a story-telling voice from multiple voices, and wherein the customized fill-in-the-blank story is output in the story-telling voice.

19. The media of claim 13, wherein the customized fill-in-the-blank story is output in a voice that corresponds to a character displayed on the user interface.

20. The media of claim 13, wherein outputting the customized fill-in-the-blank story that includes the first audible answer inserted into the prerecorded fill-in-the-blank story comprises adding background noise during playback of the first audible answer.

* * * * *